US009225925B2

(12) United States Patent
Bennett et al.

(10) Patent No.: US 9,225,925 B2
(45) Date of Patent: Dec. 29, 2015

(54) PHONE BASED TELEVISION REMOTE CONTROL

(71) Applicant: Broadcom Corporation, Irvine, CA (US)

(72) Inventors: James D. Bennett, Hroznetin (CZ); Jeyhan Kararoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/046,240

(22) Filed: Oct. 4, 2013

(65) Prior Publication Data
US 2014/0040958 A1    Feb. 6, 2014

Related U.S. Application Data

(63) Continuation of application No. 11/289,971, filed on Nov. 30, 2005, now abandoned.

(51) Int. Cl.
| | |
|---|---|
| H04N 7/18 | (2006.01) |
| H04N 5/44 | (2011.01) |
| H04M 1/02 | (2006.01) |

(Continued)

(52) U.S. Cl.
CPC ........... *H04N 5/4403* (2013.01); *H04M 1/0233* (2013.01); *H04M 1/0235* (2013.01); *H04N 7/17318* (2013.01); *H04N 21/41407* (2013.01); *H04N 21/42204* (2013.01); *H04N 21/43637* (2013.01); *H04N 21/47202* (2013.01); *H04M 2250/22* (2013.01); *H04N 2005/4425* (2013.01)

(58) Field of Classification Search
CPC ..................... H04N 5/4403; H04N 2005/4425

USPC .................................................. 725/80, 133
See application file for complete search history.

(56) References Cited

U.S. PATENT DOCUMENTS

| | | | |
|---|---|---|---|
| 6,061,435 A | 5/2000 | Grundvig et al. | |
| 7,344,084 B2 | 3/2008 | DaCosta | |

(Continued)

FOREIGN PATENT DOCUMENTS

| | | |
|---|---|---|
| DE | 10357457 A1 | 7/2004 |
| JP | 2004159245 | 6/2004 |

(Continued)

OTHER PUBLICATIONS

European Search Report for Application No. EP 06 01 6560, Dated Apr. 7, 2011.

*Primary Examiner* — Nasser Goodarzi
*Assistant Examiner* — Michael Hong
(74) *Attorney, Agent, or Firm* — Brinks Gilson & Lione

(57) ABSTRACT

A phone that interacts with a television system. At least one module may be adapted to receive a user input identifying a video selection. At least one module may also be adapted to display video information corresponding to the video selection. At least one module may further be adapted to transmit a control signal adapted to cause the display of video information corresponding to the video selection on the television system. The phone may, for example, be adapted to receive television system setting information and provide for user control of various television system settings. Also for example, the phone may be adapted to receive media guide information, present such information to a user, provide for user selection of a media element, and transmit a control signal adapted to cause delivery of the selected media element from a multimedia source to the television system.

14 Claims, 10 Drawing Sheets

(51) Int. Cl.
*H04N 7/173* (2011.01)
*H04N 21/414* (2011.01)
*H04N 21/422* (2011.01)
*H04N 21/4363* (2011.01)
*H04N 21/472* (2011.01)

(56) References Cited

U.S. PATENT DOCUMENTS

| | | | |
|---|---|---|---|
| 7,634,794 B1 | 12/2009 | Paik et al. | |
| 2002/0080161 A1 | 6/2002 | St. Maurice | |
| 2004/0177378 A1 | 9/2004 | Cool | |
| 2004/0181814 A1* | 9/2004 | Ellis et al. | 725/134 |
| 2004/0210933 A1* | 10/2004 | Dresti et al. | 725/40 |
| 2005/0097618 A1* | 5/2005 | Arling et al. | 725/114 |
| 2005/0240962 A1 | 10/2005 | Cooper et al. | |
| 2005/0262535 A1* | 11/2005 | Uchida et al. | 725/80 |
| 2005/0283814 A1 | 12/2005 | Scott et al. | |
| 2006/0041916 A1* | 2/2006 | McQuaide | 725/81 |
| 2007/0006255 A1 | 1/2007 | Cain | |

FOREIGN PATENT DOCUMENTS

| | | |
|---|---|---|
| JP | 2005150831 | 6/2005 |
| JP | 2005244676 | 9/2005 |

* cited by examiner

PHONE BASED TELEVISION REMOTE CONTROL

CROSS REFERENCE TO RELATED APPLICATIONS

This application is a continuation of U.S. application Ser. No. 11/289,971, filed Nov. 30, 2005 which is hereby incorporated herein by reference in its entirety.

This application is related to U.S. patent application Ser. No. 11/290,974 filed Nov. 30, 2005, titled "PARALLEL TELEVISION REMOTE CONTROL,", U.S. patent application Ser. No. 11/290,297, filed Nov. 30, 2005, now U.S. Pat. No. 7,852,416 issued Dec. 14, 2010, titled "CONTROL DEVICE WITH LANGUAGE SELECTIVITY," U.S. patent application Ser. No. 11/289,848, filed Nov. 30, 2005, now U.S. Pat. No. 7,932,959 issued Apr. 26, 2011, titled "PARALLEL TELEVISION DOCKING ADAPTER," and U.S. patent application Ser. No. 11/290,079, filed Nov. 30, 2005, titled "UNIVERSAL PARALLEL TELEVISION REMOTE CONTROL,", each of which are hereby incorporated herein by reference in their entirety.

1. FIELD OF INVENTION

Various aspects of the present invention, relate to controlling delivery of multimedia information to a multimedia display system.

2. DESCRIPTION OF THE RELATED ART

A typical remote control (or "Remote" as used herein) has multiple predefined buttons. A Remote is used to change TV ("Television") channels, change audio and video settings of the TV and control power supply to the TV by selecting one or more of the buttons. A Remote interacts with a TV in one direction. A remote generally sends a control signal to a TV using infrared or RF transmission. The control signal triggers the TV to implement the changes. An unobstructed view between the Remote and the TV is needed when infrared transmission is used. The Remote can however interact with the TV through obstructions, like furniture and walls, when RF transmission is used. The type of transmission used to send the control signal determines maximum allowable distance between the Remote and the TV. The maximum allowable distance in both the cases is typically only few meters.

A user generally uses multiple buttons of a Remote to control settings and display of media on a TV screen. The user receives visual information from the screen of the TV, makes a TV control choice and presses the buttons to realize the choice. Operating a Remote may be inconvenient, for example, because a user generally looks back and forth between the Remote buttons and the TV screen to complete a task.

A TV may, for example, receive channels either directly or indirectly via a set top box from a broadcaster. Many types of media systems are used to provide supplemental or alternate video to the TV. Many of these media systems directly source locally accessed media, and others alternatively or in addition provide television broadcast tuners for managing television channel selection and video and audio settings. Exemplary media systems include cable and satellite set top boxes and DVD (Digital Video Disk) players. Each of these media systems is controlled through direct interaction or via a Remote. To interact with a user via a Remote, media systems deliver information via a TV's screen and speakers and receive information directly from the Remote. Again, as previously mentioned, such interaction usually requires a user to look back and forth between the Remote and TV Screen in attempts to locate buttons and understand the Remote's operation.

Further limitations and disadvantages of conventional and traditional approaches will become apparent to one of ordinary skill in the art through comparison of such systems with the present invention.

BRIEF SUMMARY OF THE INVENTION

A phone that interacts with a television system and/or media source, substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF THE DRAWINGS

For various aspects of the present invention to be easily understood and readily practiced, various aspects will now be described, for purposes of illustration and not limitation, in conjunction with the following figures.

DETAILED DESCRIPTION

Figure 1:
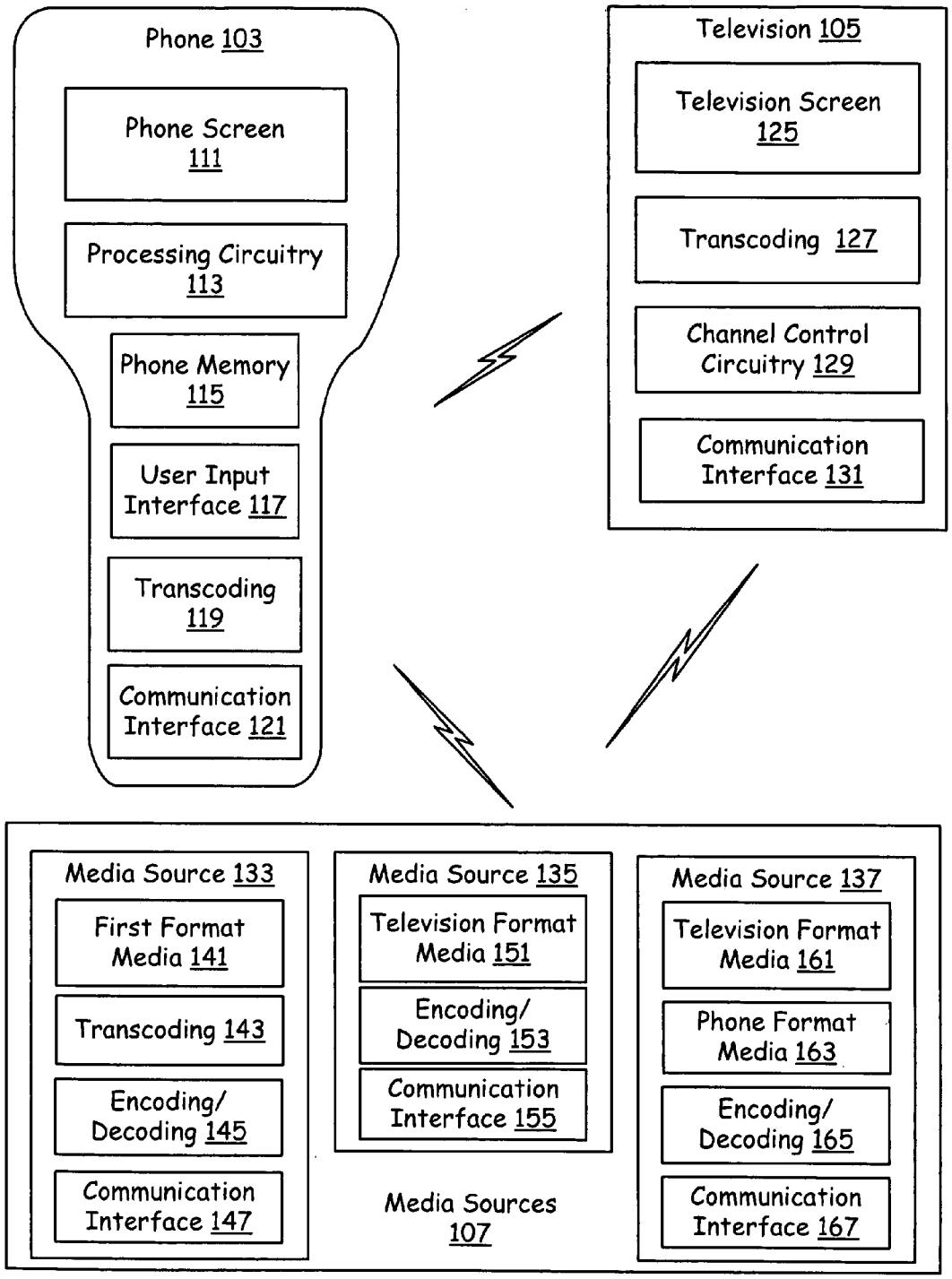
FIG. 1 is a schematic block diagram illustrating interaction between a phone that remotely controls display on a screen of a television, the television and a media source that delivers media to the television in accordance with various aspects of the present invention.

FIG. 1 is a schematic block diagram illustrating interaction between a phone 103 that remotely controls display on a screen of a television 105, the television 105 and various media sources 107 that deliver media to the television 105. The phone 103 has a phone screen 111 (e.g., a video display), processing circuitry 113 (e.g., which may comprise various hardware and/or software modules), a user input interface 117 and a communication interface 121. The television 105 has a television screen 125 associated with it.

The user input interface 117 of the phone 103 receives a selection from a user (e.g., a user input identifying a video selection), the processing circuitry 113 retrieves via the communication interface 121 a first video stream (or, for example, any of a variety of types of video information) from the media sources 107, and the phone screen 111 displays the first video stream. The processing circuitry 113 of the phone 103 also delivers (e.g., transmits) a control signal via the communication interface 121 to the television 105, where the control signal is adapted to direct the display of a second video stream on the television screen 125. The first video stream is identified for the phone screen 111 and the second video stream is identified for the television screen 125 by the selection from the user. The second video stream is delivered to the television 105 from the media sources 107.

The selection by the user may, for example, identify two (or any number of) media elements where each media element has an audio portion and a video portion. The selection may be performed using a media guide. A media guide may, for example, comprise a list that identifies a plurality of media elements available with the media sources 107. A media element may generally comprise characteristics of any of a variety of selectable units of media information (e.g., multimedia information). For example and without limitation, a media element may comprise characteristics of a movie, music video, television program, television channel, sporting or other entertainment event, news report, computer game or any of a variety of units of recorded or live multimedia information.

The communication interface 121 receives the media guide (e.g., any of a variety of types of media guide information) from the media sources 107 (or any of a variety of sources), a phone memory 115 stores the media guide, and the phone screen 111 displays the media guide. The user may, for example, select two media elements, one media element for the television 105 and another media element for the phone 103 using the media guide. The selection is entered through the user input interface 117. Subsequently, the processing circuitry 113 of the phone 103 triggers delivery of a first of the two selected media elements from the media sources 107 to the television 105 for display on the television screen 125. The processing circuitry 113 also delivers a video portion of a second of the two selected media elements to the phone screen 111 for display.

The first media element may be processed for (e.g., specifically adapted for) the television screen 125, and the second media element may be processed for (e.g., specifically adapted for) the phone screen 111. Such processing may, for example and without limitation, comprise transcoding, encoding and decoding, and/or various fitting functionalities. Any or all of such functionalities can be employed or disabled in the phone 103, in the television 105 and in the media sources 107. The phone 103 employs transcoding in block 119, the television 105 employs transcoding in block 127, and the media source 133 employs transcoding in block 143 and encoding/decoding in block 145.

The phone 103 may, for example, control various television system settings (e.g., settings related to media displayed on the television screen 125). If the user input interface 117 receives a setting perusal selection (e.g., a user input indicating that the user desires to view television system settings) from the user, the communication interface 121 receives a setting of the media displayed on the television screen 125, and the phone screen 111 displays the setting. The user may select another setting for the media displayed on the television screen 125 and enter the selection via the user input interface 117 of the phone 103. The processing circuitry 113 of the phone 103 then delivers a control signal via the communication interface 121 that directs application of the user-selected setting to the media displayed on the television screen 125.

The phone 103 is communicatively coupled to the television 105 and the media sources 107 over respective wireless links. The media sources 107 and the television 105 are communicatively coupled to each other via another wireless link. The wireless links may comprise characteristics of any of a variety of communication link types (e.g., Bluetooth, IEEE 802.11, IEEE 802.15, cellular telephony (e.g., GSM/GPRS/EDGE, CDMA, CDMA2000, UMTS, WCDMA, etc.), UltraWideBand, standard/proprietary, etc.).

The first media source 133 of the media sources 107 supports media in a first format 141. The first media source 133 employs transcoding in block 143. Transcoding is performed on the media in the first format to save bandwidth. A second media source 135 of the media sources 107 supports media in television format 151 (i.e., a format that is prescribed for the television screen 125, for example, HDTV (High Definition Television) format). A third media source 137 of the media sources 107 supports media in television format 161 and media in phone format 163 (e.g., QVGA (Quarter Video Graphics Array) format). The media sources 133, 135, 137 employ encoding/decoding functionality in blocks 145, 153 and 165, respectively. The encoding/decoding functionality may, for example, be advantageous, when the media source handles differently encoded media.

Figure 2:
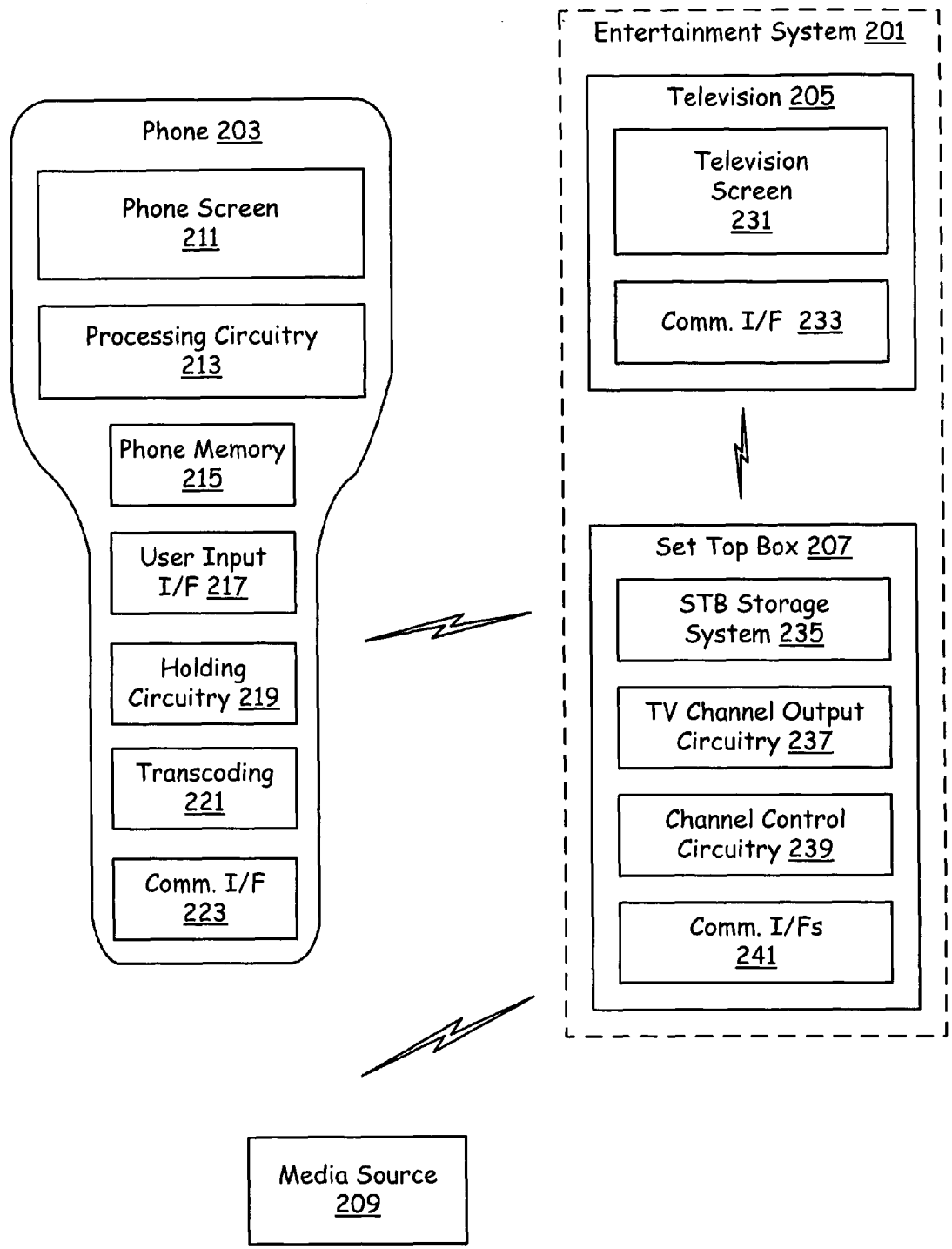
FIG. 2 is a schematic block diagram illustrating an embodiment of the phone of FIG. 1 where the phone interacts with the television via a set top box that is housed with the television in an entertainment system.

FIG. 2 is a schematic block diagram illustrating an embodiment of the phone 103 of FIG. 1 where the phone 203 interacts with the television 205 via a set top box 207 that is housed with the television 205 in an entertainment system 201 (or, e.g., any of a variety of television system configurations). The user input interface 217 of the phone 203 receives a selection from the user. The selection may, for example, identify (e.g., directly or indirectly) a first video stream (or, e.g., any of a variety of types of video information) for the phone 203 and a second video stream for the television screen 231. The processing circuitry 213 of the phone 203 requests via the communication interface 223 the first video stream from the set top box 207. The set top box 207 retrieves the first video stream from the media source 209 and sends the retrieved first video stream to the processing circuitry 213. The phone screen 211 displays the retrieved first video stream. The processing circuitry 213 delivers a control signal via the communication interface 223 to the set top box 207. The control signal directs display of the second video stream on the television screen 231. The set top box 207 subsequently receives the second video stream from the media source 209 and delivers the received second video stream to the television screen 231 for display.

The set top box 207 is communicatively coupled to the television 205, the phone 203 and the media source 209 via communication interfaces 241. The communication link between the set top box 207 and the television 205 is shown to be a wireless link. The communication link (e.g., and any communication link discussed herein) may alternatively, for example, comprise characteristics of a wired link, tethered optical link, non-tethered optical link, etc. Communication links between the set top box 207 and the television 205 and the phone 203 are, in this embodiment, wireless links. Wireless links may comprise characteristics of any of a variety of wireless link types (e.g., Bluetooth, IEEE 802.11, IEEE 802.15, UltraWideBand, any of a variety of cellular link types, any of a variety of infrared or other optical link types, standard or propriety link types, etc.).

The selection from the user may, for example, identify two media elements where each media element has an audio portion and a video portion. The selection may be performed using a media guide. A media guide may, for example, comprise a list that identifies a plurality of media elements available with the media source 209. The two selected media elements may then, for example, correspond to any of the plurality of media elements.

The communication interface 223 of the phone 203 receives a media guide (e.g., media guide information) from the media source 209 via the set top box 207. The phone memory 215 stores the media guide, and the phone screen 211 displays the media guide. The user scans the media guide and enters a selection through the user input interface 217 of the phone 203. The selection from the user identifies (e.g., directly or indirectly) two media elements, one for the television 205 and another for the phone 203.

The processing circuitry 213 of the phone 203 triggers delivery a first of the two selected media elements from the media source 209 to the set top box 207. The set top box 207 receives the first of the two selected media elements from the media source 209 and forwards the received media element to display driver circuitry of the television 205 for display on the television screen 231. The processing circuitry 213 of the phone 203 also sends a request to the set top box 207 for the second of the two selected media elements. The set top box 207 receives the second of the two selected media elements from the media source 209 and forwards the received media element to the phone 203. The phone screen 211 then displays a video portion of the second of the two selected media elements.

The processing circuitry 213 of the phone 203 manages phone calls. The phone 203 has holding circuitry 219 that pauses communication of the phone 203 with the set top box 207 and the media source 209 during call handling by the phone 203.

Figure 3:
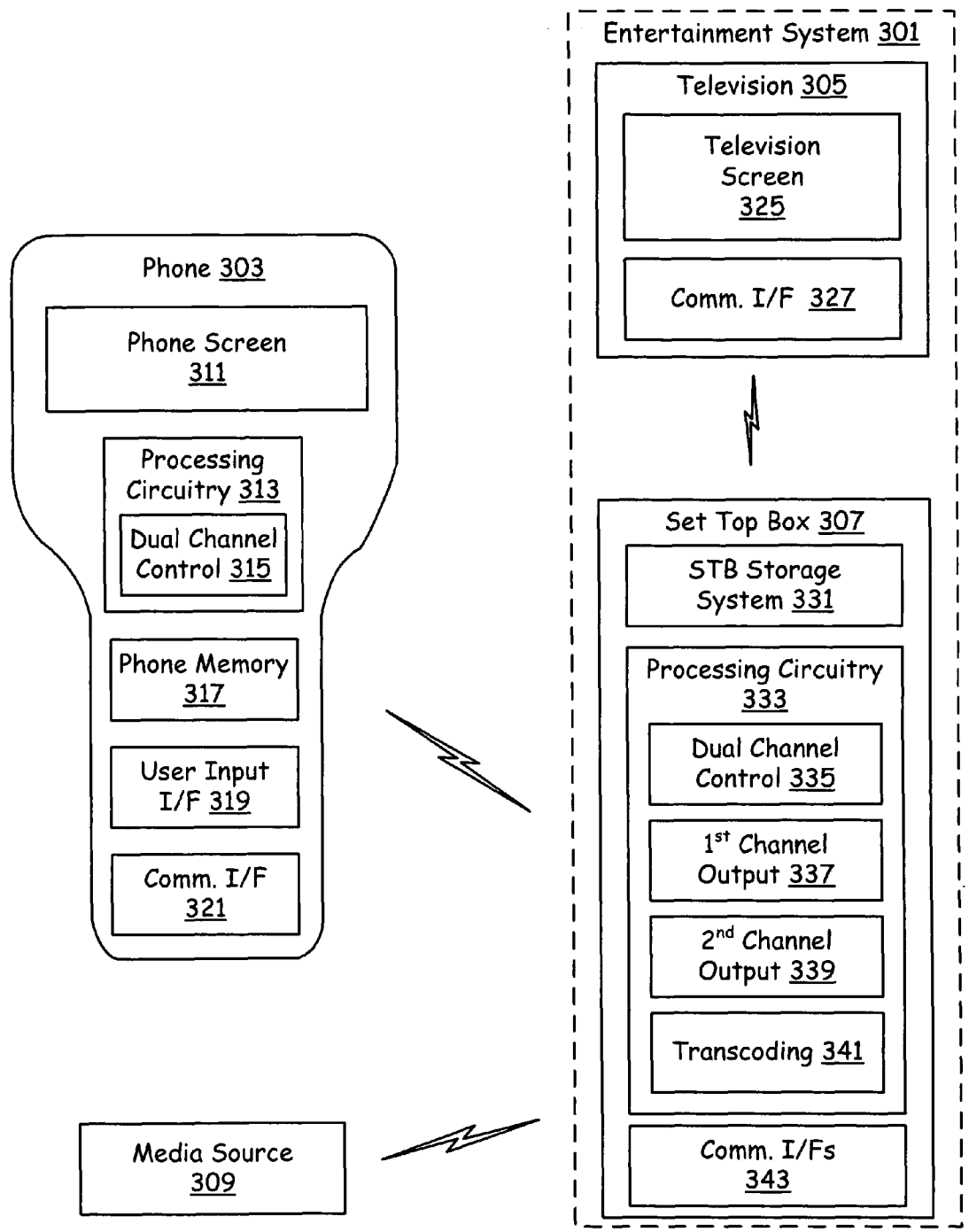
FIG. 3 is a schematic block diagram illustrating an embodiment of the phone of FIG. 2 further providing dual channel control support in the phone and in the set top box.

FIG. 3 is a schematic block diagram illustrating an embodiment of the phone 203 of FIG. 2 further providing dual channel control support in the phone 303 and in the set top box 307. The phone 303 controls display of a first television channel in the entertainment system 301 and display of a second television channel in the phone 303. Each television channel has an audio portion and a video portion. The processing circuitry 313 of the phone 303 sends a control signal to the set top box 307 directing delivery of the first television channel to the television screen 325 from the media source 309. After receiving the control signal, the set top box 307 receives the first television channel from the media source 309 and forwards the video portion of the first television channel to the television screen 325. In this non-limiting example, the media source 309 is a television channel broadcaster.

The processing circuitry 313 of the phone 303 also receives the second television channel from the media source 309 via the set top box 307 and forwards the video portion of the received television channel to the phone screen 311 for display. The processing circuitry 313 services the phone screen 311 and the television screen 325 via the set top box 307 and hence supports dual channel control functionality 315. Similarly, the set top box 307 services the phone screen 311 and the television screen 325, and hence the processing circuitry 333 of the set top box 307 also supports dual channel control functionality as shown in block 335. The first channel output 337 and the second channel output 339 are shown in the processing circuitry 333 of the set top box 307. A first of the channel outputs 337, 339 is forwarded by the processing circuitry 333 of the set top box 307 to the television screen 325, and a second of the channel outputs 337, 339 is sent to the processing circuitry 313 of the phone 303.

The phone 303 may direct a third television channel to a STB storage system 331 of the set top box 307 on receiving a media storage command from the user through the user input interface 319 of the phone 303. The media storage command from the user identifies the third television channel. The phone 303 sends a control signal to the set top box 307, which subsequently receives the third television channel from the media source 309 and stores information corresponding to the received third television channel in the STB storage system 331.

The third television channel is processed in the set top box 307 for the STB storage system 331. Such processing may, for example, comprise one or more of transcoding, encoding and decoding. Transcoding may, for example, be performed to save bandwidth occupied by the audio portion, the video portion or both of the third television channel. Encoding and decoding may, for example, be performed to make the audio and the video portion of the television channel compatible with an encoding standard used in the phone 303, in the television 305 and in the set top box 307.

Figure 4:
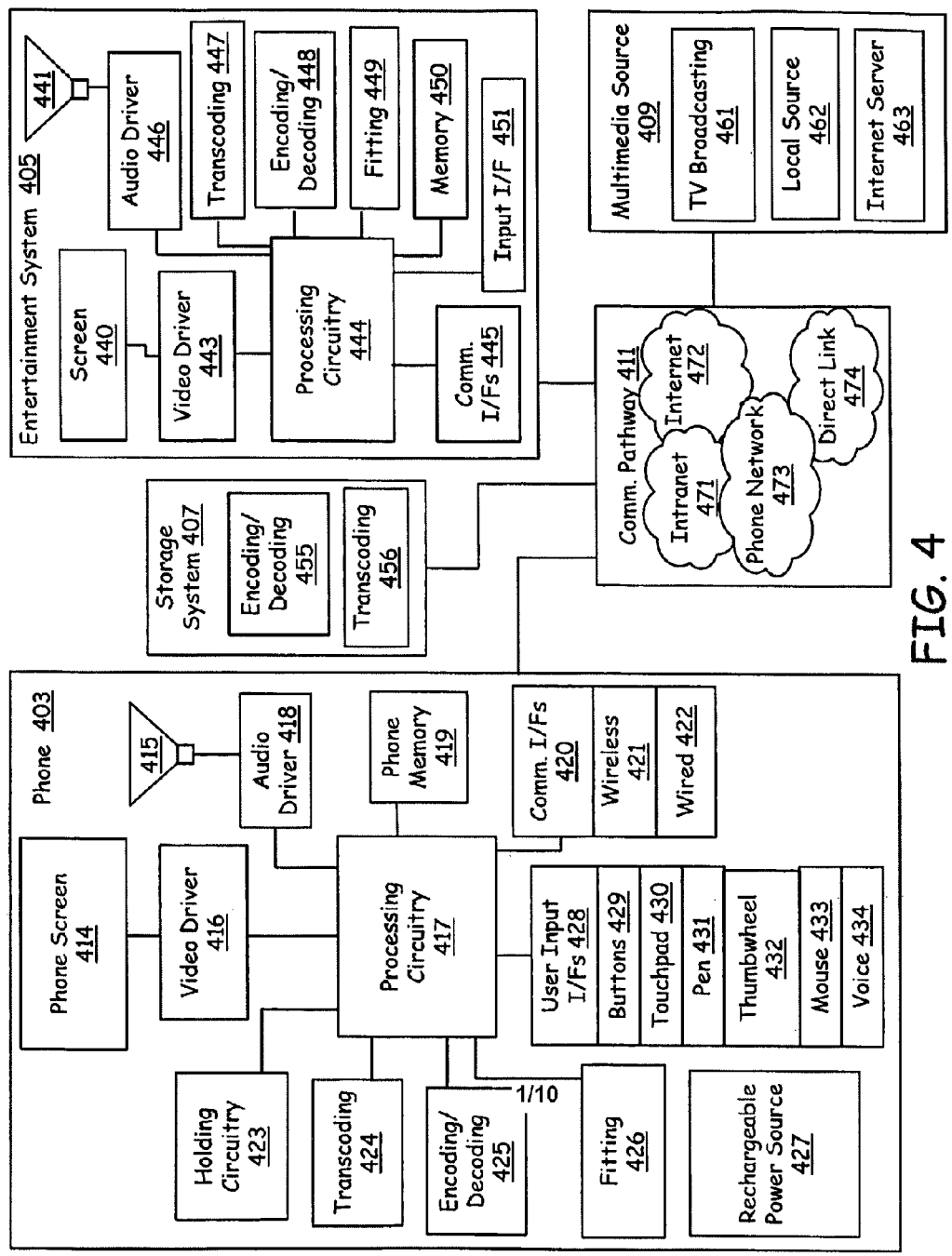
FIG. 4 is a schematic block diagram illustrating interaction between a phone, an entertainment system, a multimedia source and a storage system and communication paths between these elements in accordance with various aspects of the present invention.

FIG. 4 is a schematic block diagram illustrating interaction between a phone 403, an entertainment system 405, a multimedia source 409, a storage system 407 and communication pathways 411 between these elements. The phone 403 has a phone screen 414, a speaker 415, a phone memory 419, a communication interface 420 and a user input interface 428 that are communicatively coupled to each other via processing circuitry 417 of the phone 403. The phone 403 also comprises a rechargeable power source 427.

The communication interface 420 may be either of, or a combination of, a wireless interface 421 and a wired interface 422. The user input interface 428 may comprise one or more of: buttons 429, a touchpad 430, a pen 431, a thumbwheel 432, a mouse 433 and a voice interface 434.

The entertainment system 405 has a screen 440, a speaker 441, a memory 450, a communication interface 445 and an input interface 451 that are communicatively coupled to each other via processing circuitry 444 of the entertainment system 405. The communication interface 445 may be either of, or a combination of, a wireless interface and a wired interface. The entertainment system 405 may comprise a television and a set top box. In that case, some of the elements of the entertainment system will be housed in the television and the rest of the elements will be housed in the set top box.

The multimedia source 409 comprises television broadcasting 461, a local source 462 and an Internet server 463. The multimedia source 409 is a repository of a plurality of multimedia elements and a plurality of video streams. Each of the plurality of multimedia elements has an audio portion and a video portion. The plurality of multimedia elements may, for example, include one of, or a combination of, a television channel, a computer game, a movie and recorded multimedia. The plurality of video streams may, for example, include one or more of a recorded video, a picture, a photo, a video portion of a television channel, a video game and a live snippet.

A user uses the phone 403 to control selection and display of a multimedia element on the screen 440 of the entertainment system 405. The phone 403 receives a selection from the user via the user input interface 428. The selection may, for example, be a selection of two multimedia elements, two video streams, a multimedia element and a video stream for the phone and the entertainment system, a multimedia element for either the phone or the entertainment system, a setting selection for the entertainment system, a media storage selection for a storage system, and a media swapping selection.

Suppose the selection from the user identifies two multimedia elements, a first multimedia element for the phone 403 and a second multimedia element for the entertainment system 405. The phone 403 receives via the communication interface 420 the first multimedia element from the multimedia source 409. The audio portion of the first multimedia element is forwarded to the speaker 415 for listening, and the video portion is forwarded to the phone screen 414 for display. The phone 403 sends a control signal to the entertainment system 405 to trigger delivery of the second multimedia element from the multimedia source 409 to the entertainment system 405. The entertainment system 405 receives via the communication interface 445 the second multimedia element from the multimedia source 409. The audio portion of the second multimedia element is forwarded to the speaker 441 for listening, and the video portion is forwarded to the screen 440 for display.

The first multimedia element is processed in the phone 403. Such processing may, for example, comprise transcoding 424, encoding and decoding 425, and fitting functionalities 426. One or more of these functionalities may be disabled depending on processing capability of the processing circuitry 417, consumption of the rechargeable power source 427 and support of similar functionalities in the entertainment system 405, the multimedia source 409 and the storage system 407. The second multimedia element is processed in the entertainment system 405. Such processing may, for example, comprise transcoding 447, encoding and decoding 448, and fitting functionalities 449. One or more these functionalities may be disabled.

Either or both of the phone 403 and the entertainment system 405 may receive only the video or audio portion of a multimedia element. Either or both of the phone 403 and the entertainment system 405 can alternately, or in addition, receive a video stream, depending on the selection.

Suppose the selection corresponds to perusal of settings of the entertainment system 405. The phone 403, for example, receives speaker and screen settings of the entertainment system 405 from the entertainment system 405 via the communication interface 420 and displays the settings on the phone screen 414. If the selection corresponds to application of a different setting for either the screen or the speaker or both of the entertainment system 405, the processing circuitry 417 of the phone 403 then delivers a control signal via the communication interface 420 that directs application of the different setting to the entertainment system 405.

Suppose the selection corresponds to a media swapping request. The phone 403 sends a request to the multimedia source 409 for a first multimedia element that is currently being presented by the entertainment system. The phone 403 sends a control signal to the multimedia source 409 that directs the multimedia source 409 to deliver a second multimedia element that is currently being presented by the phone 403 to the entertainment system 405. The multimedia source 409 delivers the second multimedia element to the entertainment system 405. The entertainment system 405 then presents the second multimedia element. The phone 403 receives the first multimedia element from the multimedia source 409 via the communication interface 420. The phone 403 then presents the first multimedia element.

Suppose the selection identifies a storage system 407 and a multimedia element. The phone 403 triggers delivery of the multimedia element from the multimedia source 409 to the storage system 407. The communication pathway 411 connecting the phone 403, the entertainment system 405, the storage system 405 and the multimedia source 409 may, for example, comprise one of, or a combination of, a copper wire, a fiber and a wireless medium. Wireless technologies used for communication may, for example and without limitation, be one or more of a cellular transmission, 802.11, Bluetooth, and an infrared transmission. The storage system 407 may, for example, comprise one or more of a portable storage, a non-portable storage, a removable storage, a rewritable storage, a read only storage, a worm storage, a volatile storage and a nonvolatile storage.

The phone 403, the entertainment system 405, the storage system 407 and the multimedia source 409 are located in one or in two separate or in three separate or in four separate premises. The storage system 407 may be an integral part of the phone 403, or the entertainment system 405 or the multimedia source 409. The phone 403 can trigger delivery of the multimedia element from the multimedia source 409 to more than one storage system.

Figure 5:
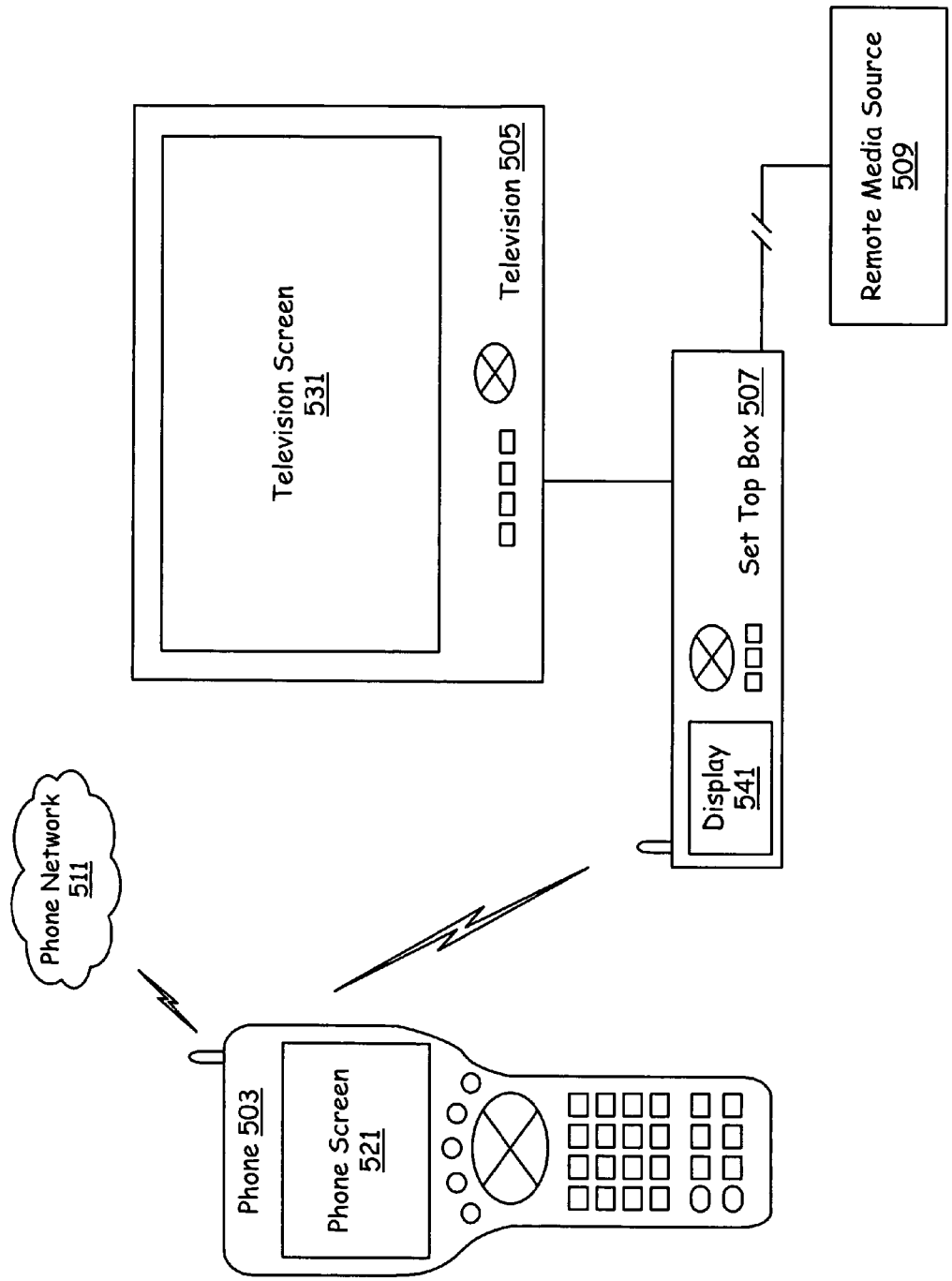
FIG. 5 is a schematic block diagram illustrating a phone that indirectly controls display of media sourced by a remote media source on a television screen in addition to managing phone calls over a wireless link.

FIG. 5 is a schematic block diagram illustrating a phone that indirectly controls display of media sourced by a remote media source 509 on a television screen 531 in addition to managing phone calls over a wireless link. The phone 503 is part of a wireless phone network 511. The phone 503 controls delivery of media from the remote media source 509 via a set top box 507. The set top box 507 is communicatively coupled to a television 505 over a wired link and to the remote media source 509 over another wired link. The wired links are one or more of a copper link and a fiber link. The set top box 507 is communicatively connected to the phone 503 through the wireless phone network 511. The set top box 507 has a wireless communication interface and a wired communication interface.

The phone 503 receives a request from a user through buttons of the phone 503 and accordingly sends a control signal to the set top box 507. The control signal from the phone 503 to the set top box 507 identifies a media element and also identifies if the media element is meant for the television 505 or the phone 503. If the media element is meant for the phone 503, then the set top box 507 receives the media element from the remote media source 509 and forwards the received media element to the phone 503. The phone 503 then displays the media element on phone screen 521. If the media element is meant for the television 505, then the set top box 507 receives the media element from the remote media source 509 and forwards the received media element to the television 505. The media element is subsequently displayed on the television screen 531. The remote media source 509 is located at a remote premises from the phone 503, the television 505 and the set top box 507. The phone 503, the television 505 and the set top box 507 may be located at the same or different premises. The remote media source 509 is one or more of a television broadcasting source, an Internet server and an Intranet server.

Figure 6:
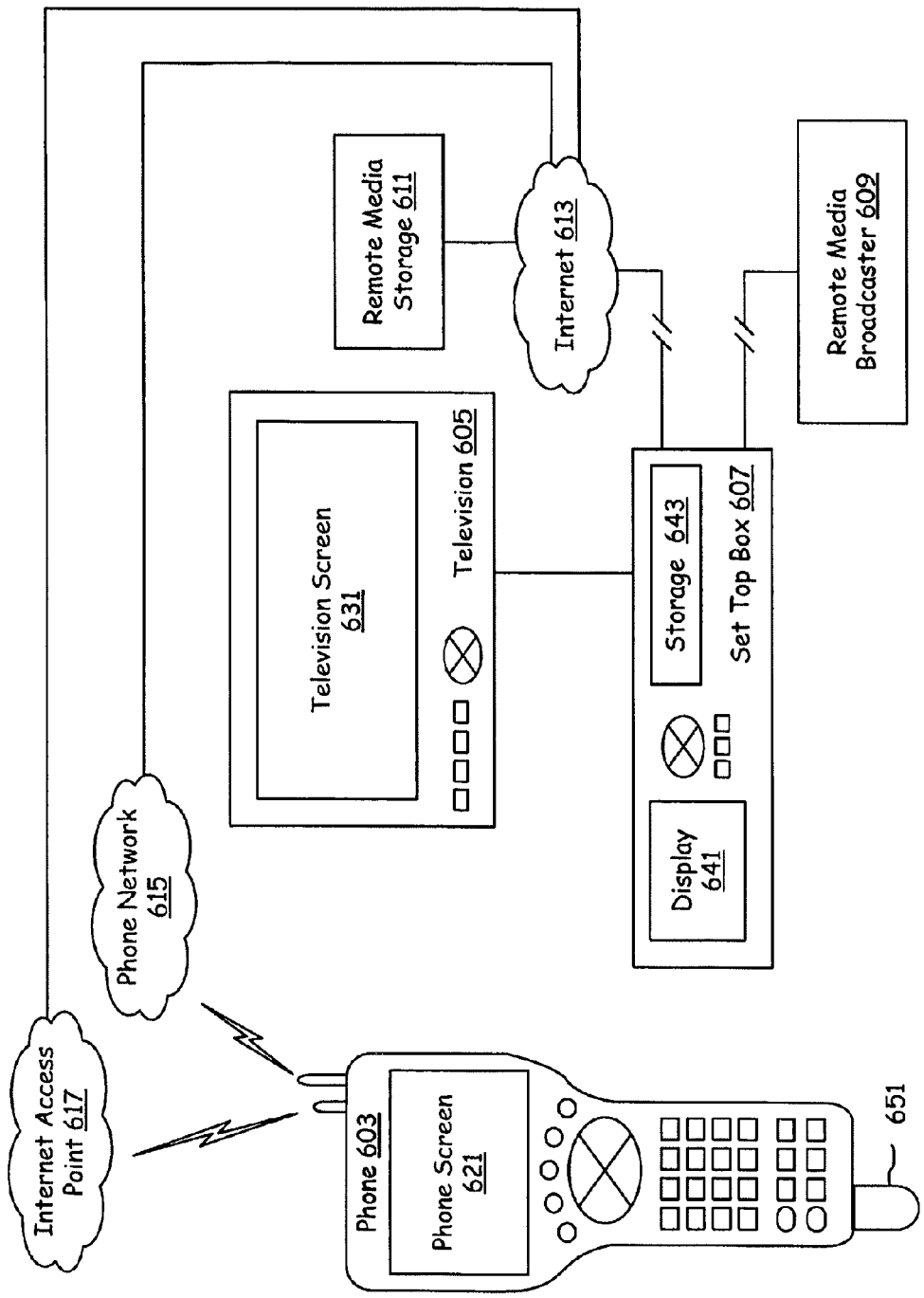
FIG. 6 is a schematic block diagram illustrating an embodiment of the phone of FIG. 5 further controlling storage of media sourced by a remote media broadcaster to a storage system.

FIG. 6 is a schematic block diagram illustrating an embodiment of the phone 503 of FIG. 5, further controlling storage of media sourced by a remote media broadcaster 609 to a storage system. The phone 603 manages phone calls over the phone network 615. The phone 603 is communicatively coupled to a set top box 607 that is communicatively coupled to the remote media broadcaster 609. The remote media broadcaster 609 is connected to the set top box 607 via one of, or a combination of, a wired and a wireless link. The phone 603 has two communication interfaces, one to communicate over the phone network 615 and another to communicate over the Internet 613. The set top box 607 has three communication interfaces, one to communicate to the television 605, another to communicate with the remote media broadcaster 609 and one to communicate over the Internet 613. The remote media broadcaster 609 has one communication interface to communicate with the set top box 607.

The storage system may be remote media storage 611 that is located at a remote premises and that is accessible through the Internet 613, may be storage 643 housed with the set top box 607 or may be removable media storage 651 that is attached to the phone 603. The phone 603 receives a media storage request from a user. The media storage request identifies the storage system and a media element that is available from the remote media broadcaster 609.

If the media storage request identifies the remote media storage 611, then the phone 603 sends a control signal to the set top box 607. The phone 603 may send the control signal to the set top box 607 through the Internet 613. The phone 603 may also send the control signal to the set top box 607 through the phone network 615. In that case, the set top box 607 has a fourth communication interface to communicate with the phone 603 over the phone network 615. Subsequently the set top box 607 receives the media element from the remote media broadcaster 609 and delivers the received media element to the remote media storage 611 over the Internet 613.

If the media storage request identifies the storage 643 housed with the set top box 607, then the phone 603 sends a control signal to the set top box 607 that triggers delivery of the media element from the remote media broadcaster 609 to the set top box 607. The set top box 607 receives the media element from the remote media broadcaster 609 and forwards the received media element to the storage 643 for storage. If the media storage request identifies the removable media storage 651 that is attached to the phone 603, then the phone 603 receives the media element from the remote media broadcaster 609 via the set top box 607 and forwards the received media element to the removable media storage 651 for storage.

The media storage request may identify more than one media storage, in which case, the media element is delivered to all the selected media storages. Communication links between different elements may, for example, comprise one of, or a combination of, a copper wire, a fiber, a cellular link, a Bluetooth link, an 802.11 link, an infrared link, an Internet link and an Intranet link.

Figure 7:
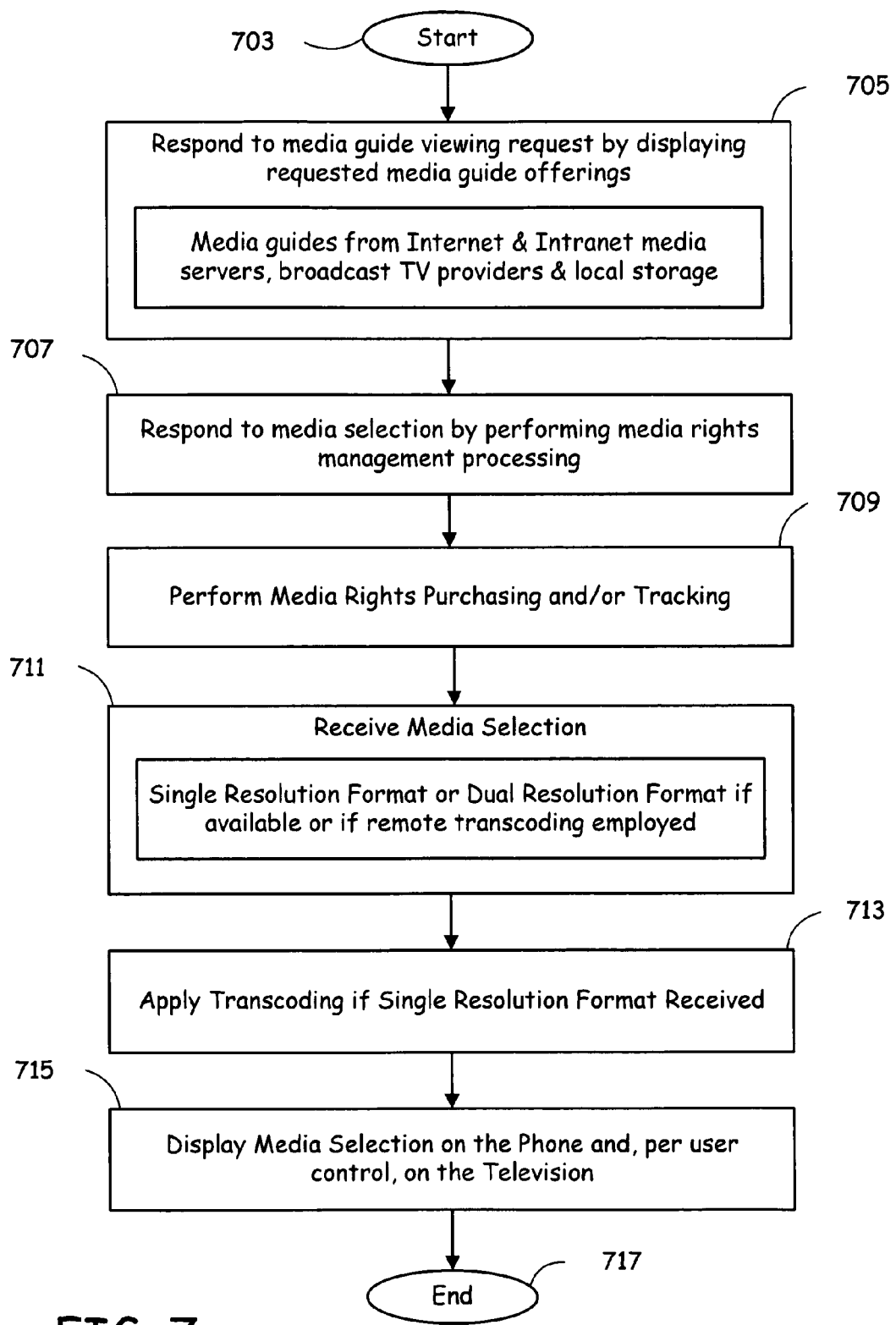
FIG. 7 is a flowchart illustrating a method of controlling selection and delivery of processed media to a television screen and to a screen of a phone-based remote control for display by the phone.

FIG. 7 is a flowchart illustrating a method of controlling selection and delivery of processed media to a television screen and to a screen of a phone-based remote control for display by the phone. The method may begin at a start block 703. In a next block 705, the phone-based remote control responds to a media guide viewing request from a user. The user may enter the media guide viewing request through an input interface of the phone. In such case, the phone receives the media guide viewing request via the input interface of the phone at the block 705 and responds to the request by receiving the media guide from the media source and displaying the media guide on the screen of the phone in step 705. A media source may, for example, comprise one of an Internet media server, an Intranet media server, a broadcast television provider and a local media storage such as a hard drive, a DVD, a CD and a tape. The media guide identifies a plurality of media elements available with the media source. The media guide helps the user to make a media selection of one or more than one media element from the plurality of media elements. A media element may, for example, comprise a movie, a television channel, an audio-visual game, a photo, a live snippet, a video, video portion of a television channel, and a video game.

In a next step 707, the phone receives the media selection from the user. The media selection may be based on the media guide. The media selection may identify a media element for either the phone or the television screen or for both. The media selection may alternately identify two media elements, one for the phone and another for the television screen. For example and without limitation, the media selection identifies a media element to be displayed on a screen of the phone. The phone sends a request to the media source seeking delivery of the media element selected from the media source. The selected media element may be a free-to-use media element. If the selected media element is not free, then the phone purchases the selected media element in next block 709. Purchasing may, for example, include one of, or a combination of, key based and plastic card based purchasing. Purchasing may include one or more user interactive steps, where the user is guided through displays on the screen of the phone followed by the phone receiving entries from the user via the input interface of the phone. If the selected media element is free-to-use then the phone may not purchase the selected media element. Even then the phone may perform credential verification functionalities at the block 709.

The phone receives the selected media element from the media source in a block 711. The selected media element may be received in a format that may or may not be supported by the screen of the phone. If the selected media element is received in a format that is not supported by the screen of the phone, then transcoding is applied to the received media element by the phone as shown in a next step 713, and transcoded media is generated. The phone may not be able to perform the transcoding because of limited processing capability, limited power and limited memory. In that case the phone may direct a transcoding server to perform the transcoding functionality at step 711. The phone may send the received media element to the transcoding server or may direct the selected media element from the media source to the transcoding server and then receive the transcoded media from the transcoding server. If the transcoding is performed by the transcoding server then the phone does not apply the transcoding to the received media element in the step 713. The phone displays the transcoded media on the screen of the phone in next and final step 715.

The media selection may in addition identify a second media element to be displayed on the television screen. The phone sends a request to the media source seeking delivery of the second media element from the media source to the television screen. The media source sends a second media element to the television for display.

Figure 8:
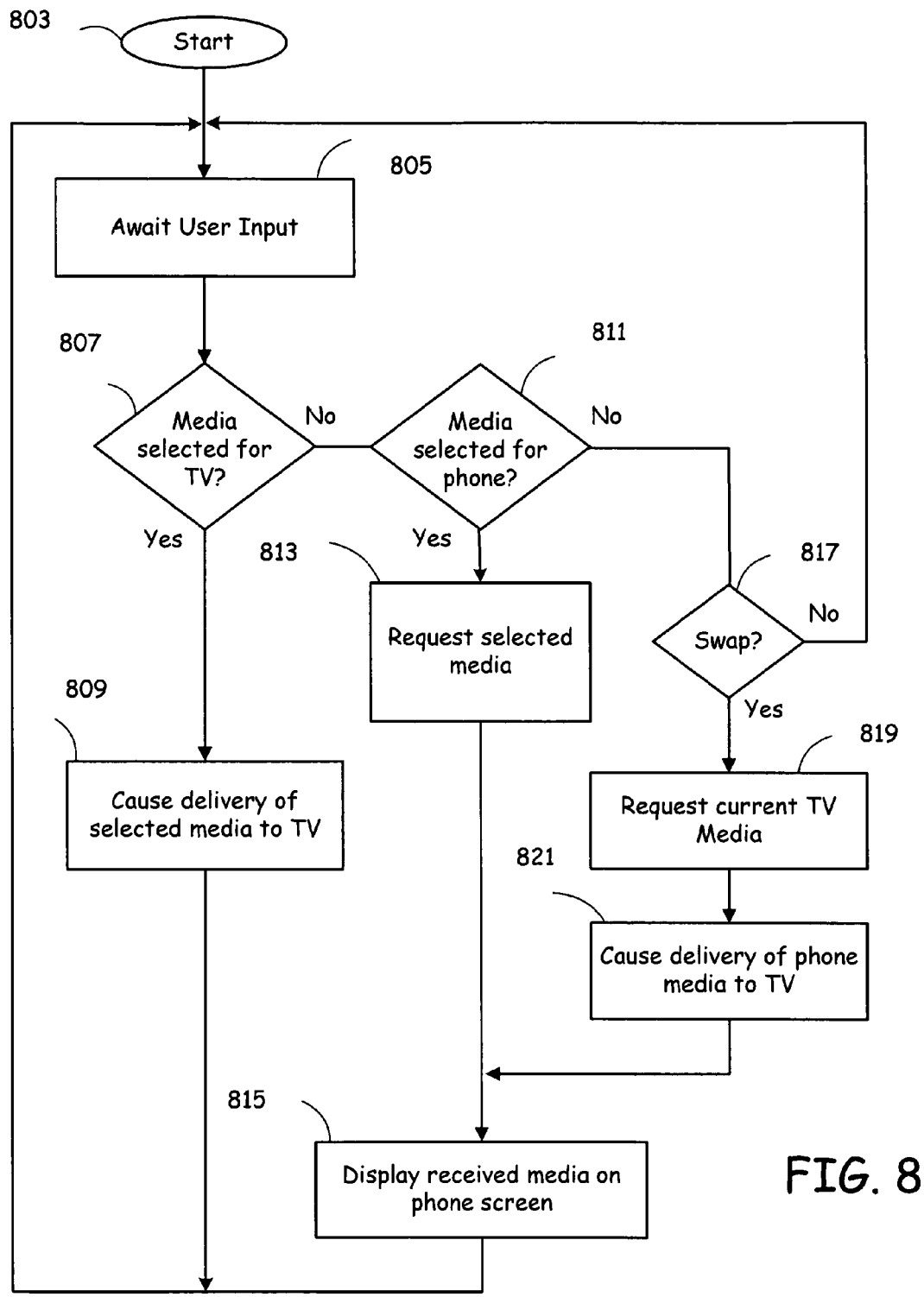
FIG. 8 is a flowchart illustrating functions of media selection and swapping of the phone-based television remote control of FIG. 7, in accordance with various aspects of the present invention.

FIG. 8 is a flowchart illustrating functions of media selection and swapping of the phone-based television remote control of FIG. 7, in accordance with various aspects of the present invention. The method may begin at block 803. The phone waits for a user input as shown at a block 805. The phone receives the user input from the user in the block 805. The user input may identify a media selection comprising a first media element for the television and/or a second media element for the phone. The user input may comprise in addition or only a media swapping request. In next step 807, the phone checks whether the first element has been selected. If the first element has been selected then the phone triggers delivery of the first media element to the television at a next step 809. Next the operation flow of the phone-based television remote control goes to the block 805.

If the phone determines in the step 807 that the first media element has not been selected, then the phone checks in step 811 if the second media element has been selected. If the phone determines that the second media element has been selected, then the phone, in next step 813, requests for the second media element. The phone may request the media source that stores the second media element for the second media element. The phone receives the second media element in the step 813. In next step 815, the phone displays the second media element on the phone screen. The operation flow of the phone jumps to the block 805 and the phone awaits another user input.

If the phone determines in the step 811 that the second media element has not been selected, then the phone checks in block 817 whether the user input comprises the media swapping request. If the user input does not comprise the media swapping request then process flow jumps to the block 805. If yes, then the phone requests for a media element that is being displayed on the television screen in a next step 819 and subsequently receives the media element that is being displayed on the television screen in the step 819. The phone also triggers delivery of another media element displayed on the screen of the phone to the television screen in step 821. The phone displays the received media element on the screen of the phone in a next step 815. Thus, the media element that was being displayed on the television screen is displayed on the screen of the phone and vice versa. The operation flow goes to the block 805 and phone awaits the another user input.

Figure 9:
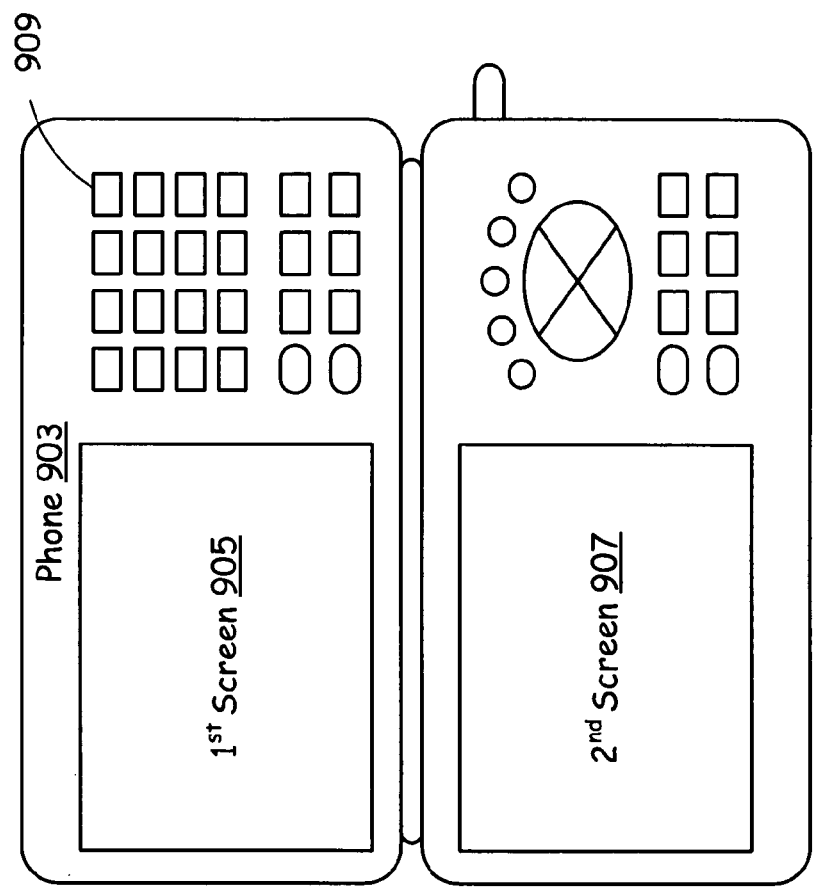
FIG. 9 is a diagram of a phone-based remote control having two screens disposed on a housing.

FIG. 9 is a diagram of a phone-based remote control of FIG. 1 having two screens disposed on a housing. The phone 903 has two screens, a first screen 905 and a second screen 907. The phone's user input interface 909 allows media guide perusal. The phone receives a media guide from a media source, stores it temporarily in the phone's memory and displays it on one of the two screens of the phone 903. The phone's user input interface 909 comprises one or more buttons in this figure. The phone's user input interface 909 may also, for example, comprise one or more of a touchpad, a thumbwheel, a mouse, a voice interface and a pen.

The phone's user input interface 909 permits selection of one video stream for display on one of the two screens of the phone 903 or on a television screen associated with the phone 903 or on both. A user makes the selection. The phone's user input interface 909 also permits selection of two different video streams, a first for display on the first screen of the phone 905 and a second for display on the television screen associated with the phone. The phone 903 may display the media guide on the second screen of the phone 907 along with the one video stream displayed on the first screen of the phone 905 if the selection requires so.

The second video stream that is displayed on the television screen associated with the phone may be displayed on the second screen of the phone 907 as well.

The phone's user input interface 909 also permits selection of two different video streams, one for display on the first screen of the phone 905 and another for display on the second screen of the phone 907.

Figure 10:
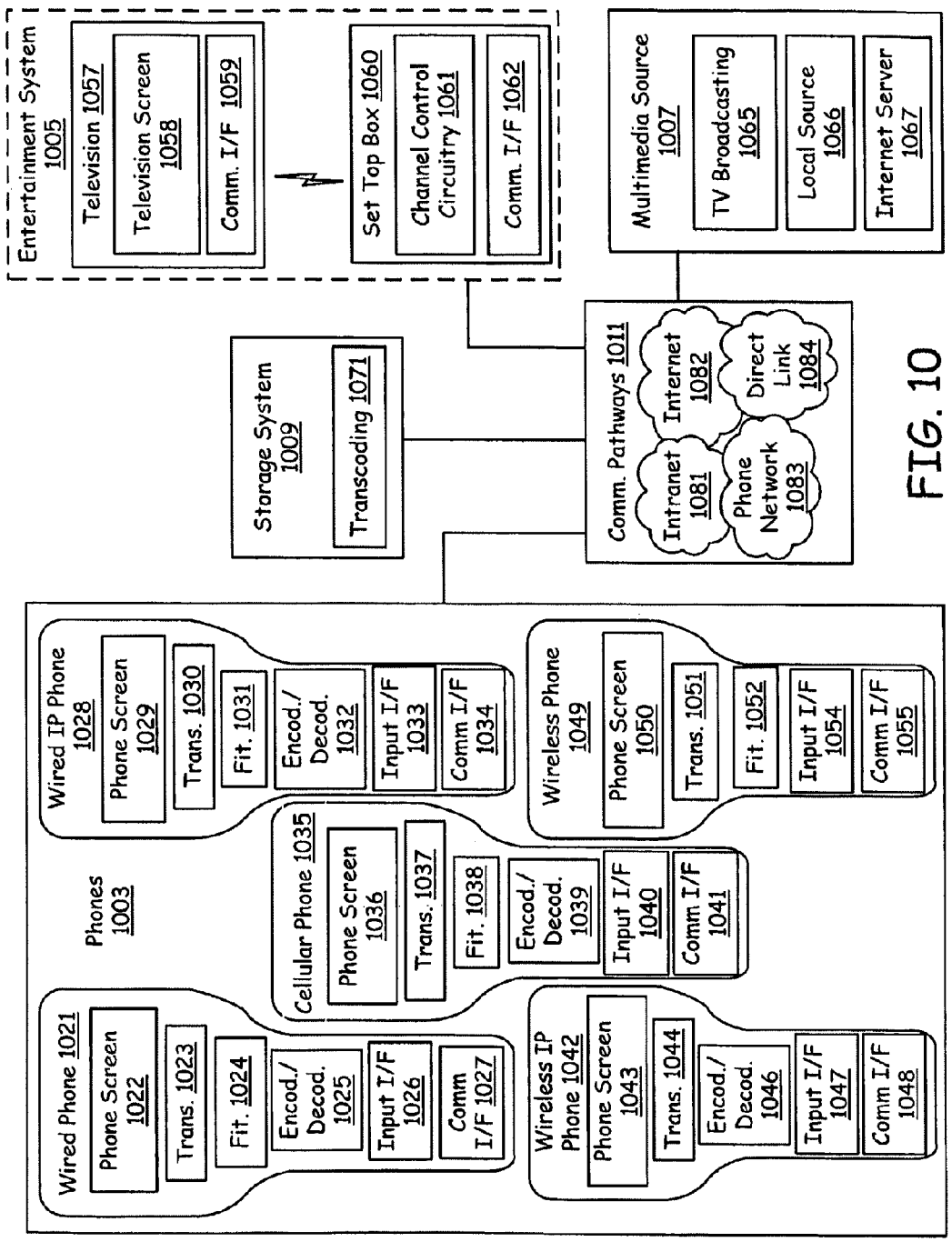
FIG. 10 is a schematic block diagram illustrating a phone with modified functionality that is capable of controlling selection and delivery of media to an entertainment system for display.

FIG. 10 is a schematic block diagram illustrating a phone 1003 with modified functionality that is capable of controlling selection and delivery of media to an entertainment system for display. The phone 1003 is one of a wired phone 1021, a wired Internet phone 1028, a cellular phone 1035, a wireless Internet phone 1042 and a wireless phone 1049. Each of the above phones has a phone screen, a user input interface, and one or more communication interfaces. Each of the above phones implements a transcoding functionality, an encoding and decoding functionality and a formatting functionality. Any one or more of these functionalities can be disabled as and when required. The entertainment system 1005 has a television 1057 and a set top box 1060. The television 1057 and the set top box 1060 are communicatively coupled to each other. The entertainment system 1005 is communicatively coupled to the phone 1003. The entertainment system 1005 implements a transcoding functionality, an encoding and decoding functionality and a formatting functionality, one or more of which may be disabled.

The phone 1003 and the entertainment system 1005 are communicatively coupled to a multimedia source 1007. The multimedia source 1007 is one or more of a television broadcasting source 1065, a local source 1066 and an Internet server 1067. The multimedia source 1007 supplies a media guide and a plurality of media elements to the phone 1003 and the entertainment system 1005. The phone 1003 manages phone calls over a phone network. In addition, the phone 1003 is capable of controlling selection and delivery of the plurality of media elements from the multimedia source 1007 to the phone 1003 and the entertainment system 1005. The phone 1003 may, in addition, control settings for media presented on the entertainment system 1005. The plurality of media elements may, for example, include one or more of a television channel, video or audio portion of the television channel, a live snippet, a recorded video, a recorded audio, a video game, an audio-visual game, a picture, a movie and a photo. The multimedia source 1007 performs a transcoding and a formatting functionality, any or both of which may be disabled.

The phone 1003 can control selection and delivery of one or more media elements from the multimedia source 1007 to a storage system 1009. The storage system 1009 performs a transcoding functionality 1071. The storage system 1009 may be located with either of or some of the phone 1003, the entertainment system 1005 and the multimedia source 1007.

Communication pathways 1011 between the phone 1003, the entertainment system 1005, the multimedia source 1007 and the storage system 1009 and the communication pathway between the television 1057 and the set top box 1060 of the entertainment system 1005 may, for example and without limitation, comprise one of, or a combination of, a copper wire, a fiber, a Bluetooth link, a 802.11 link, a cellular link, an infrared link, an Internet link and an Intranet link.

What is claimed is:

1. A method of delivering a video stream to a television, the method comprising:
   receiving a media guide through a wireless interface of a mobile device, the media guide corresponding to a plurality of media elements from an internet media server;
   displaying the media guide comprising the plurality of media elements on a first screen of the mobile device;
   selecting a first media element from the media guide for viewing on the television;
   sending a control signal to processing circuitry in communication with the television, the control signal being sent in response to the selected first media element and being operable to trigger delivery of the first media element to the processing circuitry;
   selecting a second media element from the media guide for viewing on a second screen of the mobile device; and
   displaying the second media element on the second screen of the mobile device.

2. The method according to claim 1, further comprising receiving the first media element from an internet media server via a communication interface communicatively coupled to the processing circuitry.

3. The method according to claim 2, wherein the communication interface is a wireless interface operable to access the internet media server via the internet.

4. The method according to claim 2, further comprising displaying the first media element for viewing on the television via the processing circuitry in response to the receipt of the first media element.

5. The method according to claim 4, further comprising receiving on the mobile device a setting corresponding to the first media element displayed on the television and selecting a different setting on the mobile device for the first media element displayed on the television.

6. The method according to claim 5, further comprising delivering the different setting to the television via the wireless interface of the mobile device to the communication interface.

7. The method according to claim 6, further comprising receiving and updating the setting corresponding to the first media element displayed on the television to the different setting in response to the receipt of the different setting.

8. A mobile device for directing a media element to a display device, the mobile device comprising:
  a first screen configured to display a media guide comprising a plurality of media elements;
  a user interface configured to provide selection of a first media element from the media guide for viewing on the display device;
  processing circuitry configured to send a control signal to trigger delivery of the first media element to the display device, the control signal being sent in response to selection of the first media element via the user interface; and
  a second screen, the user interface being configured to provide selection of a second media element from the media guide for viewing on the second screen of the mobile device.

9. The mobile device according to claim 8, wherein the processing circuitry is configured to receive the first media element from an internet media server via a communication interface communicatively coupled to the processing circuitry.

10. The mobile device according to claim 9, wherein the communication interface is a wireless interface operable to access the internet media server via the internet.

11. The mobile device according to claim 9, wherein the processing circuitry is configured to display the first media element for viewing on a television via the processing circuitry in response to receipt of the first media element.

12. The mobile device according to claim 11, wherein the processing circuitry is configured to receive on the mobile device a setting corresponding to the first media element displayed on the television and select a different setting on the mobile device for the first media element displayed on the television.

13. The mobile device according to claim 12, wherein the processing circuitry is configured to deliver the different setting to the television via a wireless interface of the mobile device.

14. The mobile device according to claim 13, wherein the processing circuitry is configured to receive and update the setting corresponding to the first media element displayed on the television to the different setting in response to receipt of the different setting.

* * * * *

UNITED STATES PATENT AND TRADEMARK OFFICE
CERTIFICATE OF CORRECTION

PATENT NO. : 9,225,925 B2  Page 1 of 1
APPLICATION NO. : 14/046240
DATED : December 29, 2015
INVENTOR(S) : James D. Bennett et al.

It is certified that error appears in the above-identified patent and that said Letters Patent is hereby corrected as shown below:

In the Title Page

Column 1, item 72, replace "Kararoguz" with --Karaoguz--.

Signed and Sealed this
Third Day of May, 2016

Michelle K. Lee
*Director of the United States Patent and Trademark Office*